Aug. 18, 1931.  A. M. TROGNER  1,819,138
FLUID FLOW METER
Filed Feb. 21, 1929
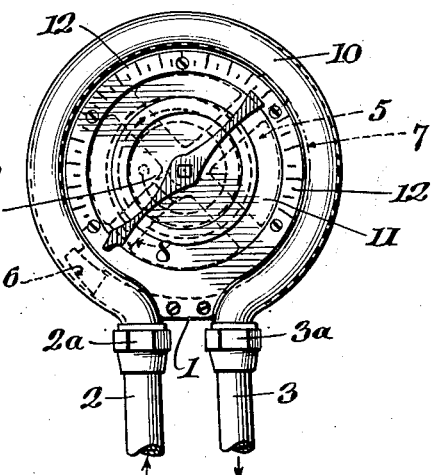
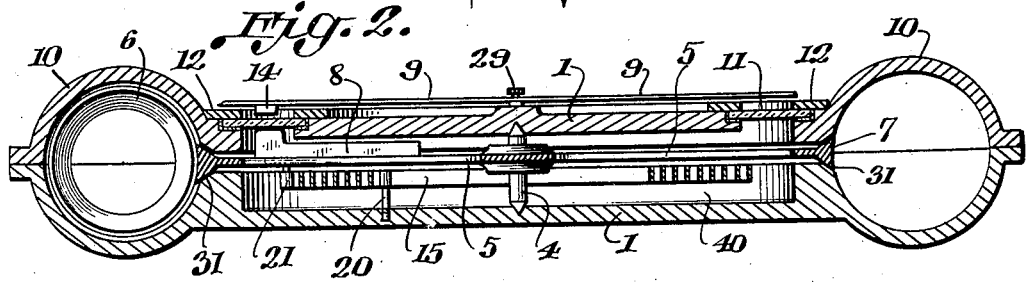
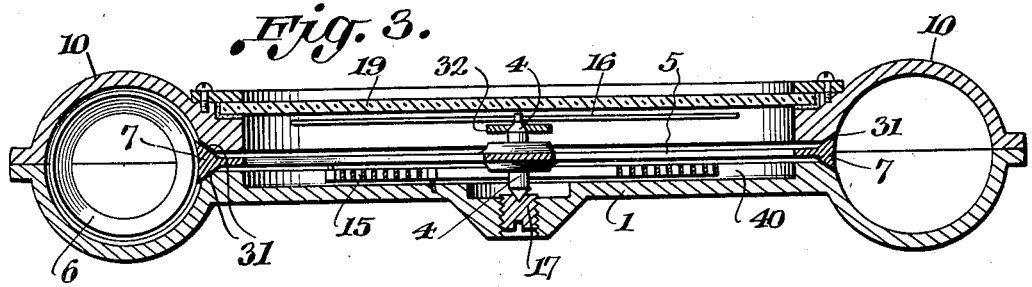
Inventor
Arthur M. Trogner
by Harold Dodd
his Atty.

Patented Aug. 18, 1931

1,819,138

UNITED STATES PATENT OFFICE

ARTHUR M. TROGNER, OF EAST ORANGE, NEW JERSEY, ASSIGNOR TO WIRED RADIO, INC., OF NEW YORK, N. Y., A CORPORATION OF DELAWARE

FLUID FLOW METER

Application filed February 21, 1929. Serial No. 341,814.

My invention relates broadly to measuring apparatus and more particularly to a construction of meter for indicating the rate of flow of fluid through a pipe line.

One of the objects of my invention is to provide a simplified construction of fluid flow meter by which the rate of flow of fluid through a pipe line may be observed at all times to permit the maintenance of the required fluid flow and avoid the dangers which might arise upon the failure of flow of fluid.

Another object of my invention is to provide a construction of fluid flow meter where the rate of flow may be directly read upon a calibrated scale and the characteristics of flow immediately indicated on the scale in the event of interruption of flow.

Still another object of my invention is to provide a simplified construction of fluid flow meter in which an indicator is moved over a scale in accordance with the rate of flow of fluid through a pipe line for rendering visible the characteristics of the movement of the fluid through the pipe line.

A further object of my invention is to provide a construction of fluid flow meter in which the fluid directly acts against a member having the characteristics of a restricted orifice, the orifice being shiftable in a restricted path within the flow meter in proportion to the rate of flow of the fluid through the meter, the movement of the restricted orifice directly controlling an indicator for rendering visible from a point outside of the meter the conditions existent within the meter.

A still further object of my invention is to provide a construction of fluid flow meter in which a restricted orifice is shiftable throughout a limited range in a pipe line in proportion to the rate of flow of fluid through the pipe line with magnetic means disposed within the casing of the meter and directly controlled by movement of the restricted orifice for correspondingly moving an indicator arranged outside of the casing of the meter for rendering visible the rate of flow of fluid through the meter.

Other and further objects of my invention reside in the construction of fluid flow meter described more clearly in the specification hereinafter following by reference to the accompanying drawings, in which:

Figure 1 is a front elevation of a fluid flow meter embodying the principles of my invention; Fig. 2 is an enlarged cross-sectional view taken through the form of fluid flow meter represented in Fig. 1; Fig. 3 is a cross-section taken through a modified form of fluid flow meter embodying the principles of my invention; and Fig. 4 shows a still further modified form of fluid flow meter embodying the construction of my invention.

The fluid flow meter of my invention finds particular application in the water circulating system employed for the cooling of high power electron tubes in radio transmission. It is important to maintain the anode of the high power tube at a predetermined temperature and water is circulated about the exterior of the anode to maintain the interior surface thereof, which is subjected to bombardment of electrons, at a temperature which is sufficiently low to permit the electron tube system to operate at maximum efficiency. Failure of the flow of fluid around the electron tube anode may result in the over heating of the tube and the breakage of the tube. High power tubes are relatively expensive and such breakage results not only in the destruction of the apparatus but the more important consideration of interruption of traffic or broadcasting which is handled by the radio transmitter system.

I provide a meter which is interposed in the water circulating system preferably between the anode cooling jacket and the water supply for indicating at all times the characteristics of flow of the fluid through the system and which will immediately indicate failure of fluid flow so that correction can be made promptly and avoid the destruction of the transmitter tube.

While I have illustrated the apparatus of my invention in the form of a meter particularly adapted for indicating flow of water, it will be understood that the same principles of construction may be employed for indicating the flow of gases and that the description and drawings are to be considered as illustrative of the principles of my invention and not as limiting my invention to a water flow system.

Referring to the drawings in more detail, reference character 1 designates a casing terminating at its periphery in a conduit 10 shaped substantially in the form of a circle having an inlet pipe 2 and an outlet pipe 3 connected thereto through couplings 2a and 3a, respectively. Centrally of the casing 1, I provide a pivot member 4 on which there is supported a rotatable member 5 in the form of a ring connected to a central hub by means of a plurality of spokes. The rotatable member 5 is enlarged at its periphery as designated at 7 to closely conform to the beveled edges 31 at the periphery of the casing 1 and substantially prevent leakage between the conduit 10 and the central chamber 40. One side of the member 5 connects to the restricted orifice member 6 which is curved to conform to the contour of the conduit 10. The movable member 5 carries a permanent magnet 8 thereon having a pole piece which extends upwardly beneath an annular plate 11 sealed in the casing 1 in such manner that the casing is water or gas type. Indicator or pointer 9 is pivoted at 29 on the tube of casing 1 and carries a magnetic member 14 thereon which serves as a follower for the permanent magnet 8 so that as the member 5 is rotated by virtue of fluid pressure acting on the restricted orifice 6, permanent magnet 8 is shifted and is accompanied by a corresponding shift in position of the follower 14. The movable member 5 is biased to a normal position by means of spiral spring 15 connected at one end 21 with the member 5 and at the opposite end 20 with the casing 1. An annular scale 12 is carried by the meter over which the indicator 9 moves to indicate the velocity of the flow through the fluid flow meter.

In the modified form of fluid flow meter represented in Fig. 3, the rotatable member 5 is journaled in bearings 32 and 17 on a pivot member 4. An indicator 16 is carried by the pivot member 4 arranged to move simultaneously with the movement of rotatable member 5. A transparent plate 19 closes the top of the casing and on this plate a scale is engraved under which the indicator 16 moves for representing the velocity of flow of fluid through the meter system. The casing 40 in which the member 5 revolves is substantially closed to the passage of water by reason of the close fit of the periphery 7 between the beveled edges 31.

In the modification illustrated in Fig. 4, I have shown the principle of my invention applied to a cylindrical type of gauge wherein a glass tube 24 is set between flanges 26 and 27, each of which have apertures as shown at 34 and 35. The supply pipe 22 is coupled through coupling 22a with the pipe section 34 for delivering fluid to the end of cylindrical tube 24. The pipe section 35 is coupled through coupling 23a with the outlet pipe 23. The cylindrical tube 24 is maintained in position between flanges 26 and 27 by rod members 28. A restricted orifice is shown at 30 having a substantially conical portion 30a terminating in a guiding flange 30b having an indicator 30c thereon. The restricted orifice is free to move longitudinally of the cylinder 24 but against the action of coil spring 25. A suitable scale 41 is engraved upon the cylindrical tube 24 and fluid which enters pipe section 34 tends to carry forward the restricted orifice 30 which moves against the action of spring 25, thereby indicating the rate of flow through the meter system by means of the position of the indicator 30c under the scale 41.

In the various types of meters the springs 15 and 25 are properly calibrated to permit indications of the rate of flow of fluid through the pipe system. A glance at the measuring instrument is sufficient for the operator to know the conditions of velocity of flow in the pipe line for enabling careful attention to be given to the apparatus protected by the fluid flow.

While I have described one of the applications of my invention as relating to cooling systems for high power tubes, it will be understood that various applications of the invention may be made. It will also be understood that my invention has been described in some of its preferred embodiments but that modifications may be made and that no limitations are intended upon my invention other than are imposed by the scope of the appended claims.

What I claim as new and desire to secure by Letters Patent of the United States is as follows:

1. A fluid flow meter comprising a conduit having a loop therein for the passage of fluid, a scale adjacent said conduit, said loop having a slot in the inner wall, a movable disc member journaled adjacent said conduit and extending through said slot and into the looped portion thereof throughout its periphery, means for resiliently biasing said disc member, a restricted orifice means carried by said movable disc member and located within said conduit, and an indicator connected with said movable disc member and movable simultaneously therewith for cooperation with said scale for indicating the rate of flow of fluid through said conduit.

2. In a meter for measuring the flow of fluid, a casing, a scale mounted adjacent said casing, an annular conduit disposed at the periphery of said casing, said conduit having a slot in the inner wall, a rotatable disc member journaled centrally of said casing and projecting through said slot in said annular conduit throughout the periphery thereof, means for resiliently biasing said disc member, a restricted orifice means carried by said rotatable member and located within said annular conduit, and an indicator movable simultaneously with the movement of said rotatable member in cooperation with said scale, whereby the rate of flow of fluid through said conduit may be observed.

3. A fluid flow meter comprising a casing, an annular conduit disposed at the periphery of said casing, said conduit having a slot in the inner wall, a scale mounted adjacent said casing, a wheel-shaped rotatable member journaled centrally of said casing and having its circumferential portion projecting into the slot in the annular conduit, means for resiliently biasing said rotatable member, a restricted orifice means carried by said rotatable member and shiftable within said conduit under the pressure of the flow of fluid through said conduit, and an indicator shiftable over said scale according to the movement of said rotatable member and in proportion to the movement of said restricted orifice means with said conduit.

4. In a fluid flow meter, a casing terminating in an annular conduit at its periphery, said conduit having a slot in the inner wall, a scale arranged adjacent said casing, a rotatable disc journaled centrally of said casing and having its circumferential portion extending through the slot in said annular conduit, means for resiliently biasing said disc member, obstruction means disposed in said conduit and carried by said rotatable means, said obstruction means being shiftable in proportion to the rate of flow of fluid through said conduit, and an indicator movable simultaneously with the movement of said rotatable means for cooperation with said scale for indicating the rate of fluid flow.

5. In a fluid flow meter, a casing terminating in an annular conduit at its periphery, said conduit having a slot in the inner wall, a scale adjacent said casing, a rotatable disc journaled centrally of said casing and extending through the slot in the annular conduit throughout the periphery of said disc, means for resiliently biasing said disc, obstruction means disposed in said conduit and carried by said rotatable disc, said obstruction means being shiftable in proportion to the rate of flow of fluid through said conduit, magnetic means carried by said rotatable disc and movable with respect to said scale, and an indicator journaled exteriorly of said casing, said indicator having a follower thereon cooperating with said magnetic means, whereby movement imparted to said rotatable disc is accompanied by a corresponding movement of said indicator.

6. A fluid flow meter comprising a casing terminating in an annular conduit at its periphery, said conduit having a slot in the inner wall, a scale disposed adjacent said casing, a rotatable member journaled in said casing and extending through the slot in said annular conduit throughout the periphery thereof, obstruction means disposed in said conduit and carried by said rotatable member, means for normally biasing said rotatable member in a predetermined position, an indicator shiftable by movement of said rotatable member, said indicator being movable over said scale whereby the passage of fluid through said conduit tends to move said obstruction and impart corresponding movement to said indicator for permitting observations on said scale of the rate of flow within said conduit.

7. A fluid flow meter comprising a casing, a scale mounted adjacent said casing, an inlet connection and a discharge connection for said casing, said casing including a conduit forming a circular fluid path extending between said inlet connection and said discharge connection, said conduit having a slot in the inner wall, a rotatable disc journaled centrally of said casing and having the peripheral edge thereof projecting through said slot into said circular path, the periphery of said rotatable disc being enlarged to substantially seal said slot around said casing, a nozzle device carried tangentially by said rotatable disc, spring means for biasing said disc in a predetermined direction for opposing the effect of fluid pressure on said nozzle in the course of the passage thereof through the circular path in said casing, and an indicator connected with said disc and movable over said scale for observing the condition of flow of the fluid through said casing.

M. TROGNER.